United States Patent [19]

Schmidt et al.

[11] 4,374,971
[45] Feb. 22, 1983

[54] PROCESS FOR THE PREPARATION OF THERMOPLASTIC AROMATIC POLYPHOSPHONATES WITH IMPROVED THERMAL AGEING RESISTANCE

[75] Inventors: Manfred Schmidt, New Martinsville, Va.; Dieter Freitag; Ludwig Bottenbruch, both of Krefeld, Fed. Rep. of Germany

[73] Assignee: Bayer Aktiengesellschaft, Leverkusen, Fed. Rep. of Germany

[21] Appl. No.: 201,254

[22] Filed: Oct. 27, 1980

[30] Foreign Application Priority Data

Oct. 31, 1979 [DE] Fed. Rep. of Germany ....... 2944093

[51] Int. Cl.$^3$ .............................................. C08G 79/04
[52] U.S. Cl. ..................................... 528/167; 260/930
[58] Field of Search .......................... 528/167; 260/930

[56] References Cited

U.S. PATENT DOCUMENTS 2,636,876  4/1953  Zenftman et al. ................... 528/167
2,682,522  6/1954  Coover, Jr. et al. ................ 528/167
4,072,658  2/1978  Okamoto et al. .................... 528/167

Primary Examiner—Lester L. Lee

Attorney, Agent, or Firm—Connolly and Hutz

[57] ABSTRACT

A process for the preparation of a linear or branched-chain thermoplastic aromatic polyphosphonate having an average molecular weight (number average $\overline{M}_n$) in the range of from 11,000 to 200,000, which comprises solvent-free ester interchange of at least one diaryl phosphonate or at least one diaryl phosphonate and at least one triaryl phosphate with at least one aromatic dihydroxy compound or at least one aromatic dihydroxy compound and at least one aromatic tri- or tetra-hydroxy compound or a mixture thereof in an oxygen-free gas atmosphere at atmospheric pressure or reduced pressure, with removal of the volatile constituents by distillation, and in the presence of a catalytic quantity of an ester interchange catalyst which comprises at least one compound taken from the group, $C_1$–$C_{18}$ tetraalkyl titanates, $C_2$–$C_4$ dialkyl tin oxides, $C_2$–$C_4$-di-alkyl-$C_1$–$C_4$-dialkoxy tin compounds, $C_3$–$C_{18}$ tetraalkyl zirconates and $C_2$–$C_{18}$ trialkyl vanadylates, antimony or bismuth salts, $C_2$–$C_4$ dialkyl stannic acid esters, $C_2$–$C_4$ trialkyl stannic acid esters, or a mixture of at least one compound from the above group and germanium dioxide or titanium dioxide.

7 Claims, No Drawings

PROCESS FOR THE PREPARATION OF THERMOPLASTIC AROMATIC POLYPHOSPHONATES WITH IMPROVED THERMAL AGEING RESISTANCE

This application relates to a process for the preparation of thermoplastic aromatic polyphosphonates with improved thermal age resistance and their use for the manufacture of moulded products.

Phosphonic acid diaryl esters and optionally also triarylphosphates are reacted with aromatic dihydroxy compounds and optionally aromatic tri- and/or tetrahydroxy compounds in a solvent-free ester interchange reaction in which monohydroxy arylene is split off, the ester interchange being catalysed by neutral esters of titanium, zirconium or of vanadium, antimony or bismuth salts, dialkyl tin oxides, dialkyl dialkoxy tin compounds, neutral esters of dialkyl stannic acids, neutral esters of trialkyl stannic acids, or mixtures of germanium dioxide or titanium dioxide with one of the above mentioned catalysts.

The aromatic polyphosphonates prepared by the process according to the invention are found to be substantially improved in their thermal age resistance compared with polyphosphonates prepared by the process of solvent-free ester interchange in the presence of acid or alkaline catalysts.

It is known that polyphosphonates can be prepared by a reaction of phosphonic acid diaryl esters with aromatic dihydroxy compounds in the presence of anhydrous magnesium chloride (see U.S. Pat. No. 2,682,522).

The polymers prepared by this process are not sufficiently high molecular weight to be used as thermoplastic chemicals, and moreover any of the catalysts used in this process which remain behind in the polymer cause rapid molecular weight degradation of the polymer by thermal ageing in air, as can be demonstrated by a determination of the relative solution viscosity.

It has also been proposed that thermoplastic aromatic polyphosphonates be prepared by ester interchange of phosphonic acid diaryl esters with aromatic dihydroxy compounds in the presence of up to 3 mol percent of branching monomers such as triaryl phosphates and/or 3- or 4-functional aromatic hydroxy compounds, using alkaline compounds as ester interchange catalysts which may be neutralized at the end of the polycondensation reaction by the addition of equimolar quantities of acid compounds such as dialkyl sulphates or acid chlorides. The thermoplastic aromatic polyphosphonates obtained by this process are highly flame resistant polymers with good properties as chemical raw materials but still undergo a decrease in their relative solution viscosity as a result of thermal ageing.

It has surpriseingly been found that the thermal age resistance of these thermoplastic aromatic polyphosphonates can be substantially improved if, instead of the alkaline or acid ester interchange catalysts, there are used from $10^{-4}$ to $2 \times 10^{-2}\%$ by weight, based on 100% by weight of the aromatic dihydroxy compounds, of special neutral ester interchange catalysts. The scope for technical application of the polyphosphonate is thereby considerably increased.

This invention therefore provides a process for the preparation of linear or branched chain thermoplastic aromatic polyphosphonates having average molecular weights (number average Mn) ranging from 11,000 to 200,000 by a solvent-free ester interchange of at least one diaryl phosphonate and optionally at least one triaryl phosphate with at least one aromatic dihydroxy compound and optionally at least one aromatic tri- and/or tetrahydroxy compound in an oxygen-free atmosphere at atmospheric pressure or reduced pressure in the presence of catalytic of an ester interchange catalyst, accompanied by removal of the volatile constituents by distillation, characterised in that the ester interchange catalyst used consists of at least one compound taken from the group of $C_1$–$C_{18}$ tetraalkyl titanates, $C_2$–$C_4$ dialkyl tin oxides, $C_2$–$C_4$ dialkyl-$C_1$–$C_4$ dialkoxy tin compounds, $C_3$–$C_{18}$ tetraalkyl zirconates and $C_2$–$C_{18}$ trialkyl vanadylates, antimony or bismuth salts, $C_2$–$C_4$ dialkyl stannic acid esters, $C_2$–$C_4$ trialkyl stannic acid esters, or a mixture of at least one compound of the above group and germanium dioxide or titanium dioxide.

The following neutral ester interchange catalysts are suitable for the purpose of the invention:
(a) $C_1$–$C_{18}$ tetraalkyl titanates such as, for example, titanium tetraethylate, titanium tetrapropylate, titanium tetraisopropylate, titanium tetrabutylate, titanium tetraoctonate, and titanium tetrastearate,
(b) Dialkyl tin oxides such as, for example, di-isopropyl tin oxides and dibutyl tin oxide,
(c) dialkyl-dialkoxy tin compounds such as, for example, diisopropyl-dimethoxy-tin, dibutyl-diisopropoxy-tin and dibutyl-dimethoxy-tin,
(d) $C_3$ to $C_{18}$ tetraalkyl zirconates such as, for example, zirconium tetraacetyl acetonate, zircondium tetrabutylate, zirconium tetraoctonate and zirconium tetrastearate,
(e) $C_2$–$C_{18}$ trialkyl vanadylates such as, for example, vanadyl-ethylate VO $(OC_2H_5)_3$, vanadyl-isopropylate VO $(O$-$i$-$C_3H_7)_3$, and vanadyl-n-butylate VO $(O$-$n$-$C_4H_9)_3$, and
(f) antimony salts such as, e.g., antimony acetate, antimony phosphate, antimony oxalate,
(g) bismuth salts such as, e.g., bismuth stannate, bismuth acetate, bismuth benzoate, bismuth oxalate, bismuth titanate, bismuth tribromophenolate,
(h) $C_2$–$C_4$ dialkyl stannic acid esters such as, e.g., dibutyl tin tartrate, dibutyl tin di-(o-phenyl)-phenolate,
(i) $C_2$–$C_4$ trialkyl stannic acid esters such as, e.g., tributyl tin acetate, tributyl tin benzoate,
(j) mixtures of germanium dioxide or titanium dioxide with at least one of the above mentioned catalysts (a) to (i).

The thermoplastic aromatic, optionally branched-chain polyphosphonates with average molecular weights (number average $M_n$) of 11,000 to 200,000 prepared by the process according to the invention may consist of recurring units of the structures corresponding to the formulae (A) 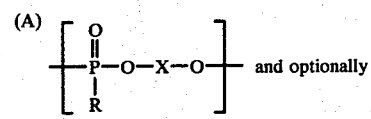 and optionally -continued (B) 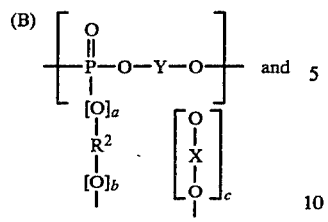

(C) the following end groups

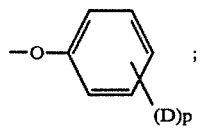

—OH; —O—X—OH attached to phosphorus in the structures (A) and (B), and the following end groups

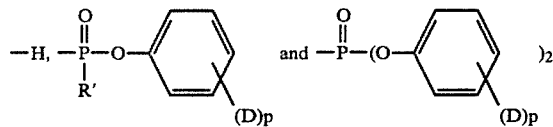

attached to the oxygen atom.

The symbols X, D, p and R are defined below. The proportion of (B), based on the sum of (A) and (B) may be from 0 to 3 mol percent and the various symbols in structures (A) and (B) have the following meaning:

$R^1$ = at least one of the following groups:
  $C_1$–$C_{12}$ alkyl,
  $C_2$–$C_{12}$ alkenyl,
  $C_6$–$C_{30}$ cycloalkyl, cycloalkenyl, aryl, arylalkyl or arylalkenyl, in which the aryl group may be either unsubstituted or substituted by 1–5 $C_1$–$C_4$ alkyl groups or by 1–5 halogen atoms (F, Cl or Br) or by the above-mentioned alkyl groups and halogen atoms, X = at least one of the following groups:

phenylene 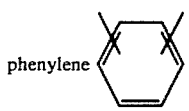

biphenylene 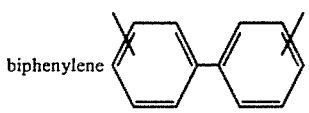

$C_1$–$C_4$ alkylene-bisphenylene 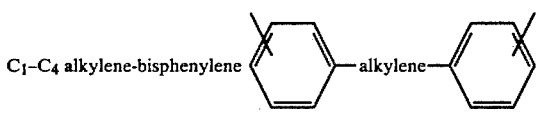

$C_5$–$C_{12}$ cycloalkylene-bisphenylene 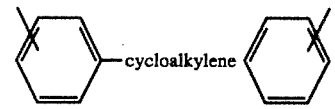cycloalkylene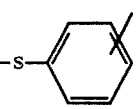

thiobisphenylene 

oxibisphenylene 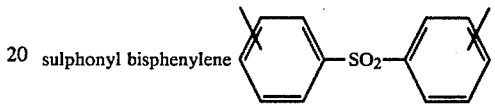

sulphonyl bisphenylene 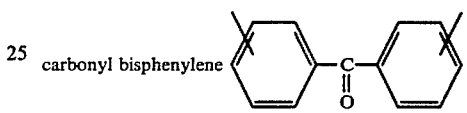

carbonyl bisphenylene 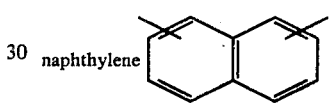

naphthylene in which each phenyl nucleus may be either unsubstituted or substituted by 1 to 4 $C_1$–$C_4$ alkyl groups or by 1 to 4 halogen atoms (F, Cl or Br) or by the above-mentioned alkyl groups and halogen atoms, and the naphthalene nucleus may be either unsubstituted or substituted by 1 to 6 of one or more of the above-mentioned groups or atoms;

Y = a trivalent or tetravalent group of a trifunctional mono nuclear or trifunctional or tetrafunctional polynuclear phenol minus the phenolic hydroxyl groups; in the case of a multinuclear phenol, the aromatic nuclei carrying one or two phenolic hydroxyl groups are linked through aliphatic $C_1$–$C_7$ hydrocarbon groups or through at least one benzene group;

Y = X when c=0, a=1 and b=1 and at the same time $R^2$=Y'(—O—X—O)$_{c'}$ or $R^2$=x, where Y'=Y and c'=1 or 2, a=0 or the number 1;

b=0 or the number 1;

c=0 or one of the numbers 1 or 2, and preferably c=1 or 2;

$R^2$=$R^1$ when a and b each equal 0, in which case Y must denote a trivalent or tetravalent group as defined above;

$R^2$=

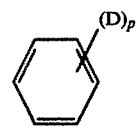

when a=1 or b=0, in which case Y must denote a trivalent or tetravalent group as defined above;

$R^2 = X$ or $Y'$ $(O-X-O)_{c'}$, when a and b are each 1;

D may be identical or different and denotes a $C_1-C_4$ alkyl group or halogen (F, Cl or Br) and $p=0$ or a number from 1 to 5, preferably $p=0$.

The above definitions preferably have the following meaning:

$R^1$ = at least one of the groups, methyl or phenyl, in particular methyl;

X = at least one of the groups, phenylene, biphenylene, $C_1-C_4$ alkylene-bisphenylene, in which each phenyl nucleus may be substituted by 1-4 methyl groups, cyclohexylene-bisphenylene, oxibisphenyl, thiobisphenylene or sulphonylbisphenylene, in particular a $C_1-C_4$ alkylene bisphenylene, in which each phenyl nucleus may be substituted by one or two methyl groups;

Y = a trivalent or tetravalent group of a trifunctional mono-nuclear or trifunctional or tetrafunctional polynuclear phenol minus the phenolic hydroxyl groups, wherein, in the case of a polynuclear phenol, the aromatic nuclei carrying one or two phenolic hydroxyl groups may be linked together through aliphatic $C_1-C_7$ hydrocarbon groups or through at least one benzene group;

a = 0 or the number 1;

b = 0 or the number 1;

c = one of the numbers 1 or 2;

$R^2 = R^1$ when a and b each = 0;

$R^2 =$

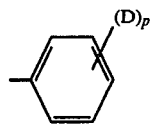

when a = 1 and b = 0;

$R^2 = X$ or $Y'$ $(O-X-O)_c$, when a and b each = 1;

D may be identical or different and denotes a $C_1-C_4$ alkyl group and $p=0$ or a number from 1 to 5, in particular $p=0$.

The thermoplastic aromatic polyphosphonates prepared by the process according to the invention preferably have average molecular weights (number average $\overline{M}_n$) in the range of from 13,000 to 80,000, in particular from 13,000 to 40,000. Determination of the molecular weights is carried out by the method of membrane osmosis using membranes which are impermeable to particles with molecular weights of up to 3,000.

According to the process of the invention, from 97 to 100 mol of at least one diaryl phosphonate may be reacted in the melt with from 90 to 99 mol of at least one aromatic dihydroxy compound at 90° C. to 340° C. in an oxygen-free atmosphere at atmospheric pressure or reduced pressure in the presence of from $10^{-4}$ to $2 \times 10^{-2}\%$ by weight, based on 100% by weight of the aromatic dihydroxy compound put into the process, of at least one of the neutral catalysts used according to the invention, with removal of the volatile constituents by distillation.

The phosphonic acid diaryl esters used for the ester interchange are preferably compounds corresponding to formula (I):

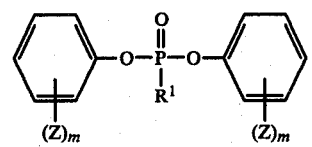

wherein $R^1$ denotes at least one of the following groups: $C_1-C_{12}$ alkyl, $C_2-C_{12}$ alkenyl, $C_6-C_{30}$ cycloalkyl, cycloalkenyl, aryl, arylalkyl or arylalkenyl, the aryl group in each case being either unsubstituted or substituted by 1-5 $C_1-C_4$ alkyl groups or by 1-5 halogen atoms (F, Cl or Br) or by the above-mentioned alkyl groups and halogen atoms, and Z = F, Cl, Br or $C_1-C_4$ alkyl, and two or more Z groups in an aryl group may be identical or different, and m = 0 or an integer from 1 to 5.

Methyl or phenyl phosphonic acid diphenyl esters are preferably used.

Preferred aromatic dihydroxy compounds correspond to one or other of the following formulae (II) and (III):

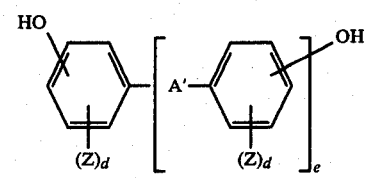

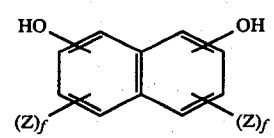

wherein

A' denotes a single bond, an alkylene group having 1 to 4 C-atoms, a cycloalkylene group having 5 or 6 C-atoms, a sulphonyl group, a carbonyl group, oxygen or sulphur;

e = 0 or 1,

Z denotes F, Cl, Br or $C_1-C_4$ alkyl, and two or more Z groups in one aryl group may be identical or different, d represents 0 or one of the integers 1 to 4, and f represents 0 or one of the integers 1 to 3.

Particularly preferred are compounds of formula (II) in which e = 1 and A' denotes a single bond, the 2,2-propylene group or sulphur and d = 0, particularly 2,2-bis-(4-hydroxyphenyl)-propane and 4,4'-dihydroxy diphenyl.

As branching monomers there may optionally be used from 0.01 to 3 mol %, based on the diaryl phosphonates put into the process, of a triaryl phosphate corresponding to formula (IV):

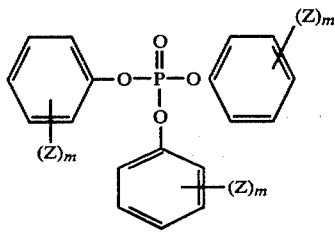

wherein Z and m have the meaning indicated for formula (I). Triphenyl phosphate is particularly preferred.

As branching monomers there may also be used from 0.01 to 3 mol %, based on the dihydroxy compounds put into the process, of aromatic trihydroxy or tetrahydroxy compounds in such quantities that the sum of branching triaryl phosphates of formula (IV) and branching aromatic tri- or tetrahydroxy compounds is not more than 3 mol %.

The following are preferred trihydroxy and tetrahydroxy compounds: phloroglucinol; 4,6-dimethyl-2,4,6-tri-(4-hydroxyphenyl)-heptene-2; 4,6-dimethyl-2,4,6-tri-(4-hydroxyphenyl)heptane; 1,3,5-tri-(4-hydroxyphenyl)-benzene; 1,1,1-tri-(4-hydroxyphenyl)-ethane; tri-(4-hydroxyphenyl)-phenylmethane; 2,2-bis-[4,4-bis-(4-hydroxyphenyl)-cyclohexyl]-propane; 2,4-bis-(4-hydroxyphenyl)-isopropyl phenol; 2,6-bis-(2'-hydroxy-5'-methyl-benzyl)-4-methylphenol; 2-(4-hydroxyphenyl)-2-(2,4-dihydroxyphenyl)-propane; tetra-(4-hydroxyphenyl)-methane; tetra-[4-(4-hydroxyphenyl isopropyl)-phenoxy]-methane and 1,4-bis-(4,4''-dihydroxytriphenyl-methyl)-benzene or mixtures thereof.

All the starting materials used for the ester interchange reaction should have a degree of purity greater than 99.1%, preferably greater than 99.7%.

To carry out the process according to the invention, the phosphonic acid diaryl esters and, if used, the triaryl phosphates are reacted with the aromatic dihydroxy compounds and optionally trihydroxy or tetrahydroxy compounds in an oxygen-free atmosphere, i.e. in the presence of an inert gas as nitrogen or carbon dioxide and in the presence of the above-mentioned neutral catalysts at temperatures in the range of from 90° C. to 340° C., in particular at temperatures of from 150° C. to 320° C. The reaction is continued under a stream of inert gas until the desired degree of condensation is reached, while the volatile aromatic monohydroxy aryls are distilled off at an elevated temperature, preferably under vacuum.

After completion of the polycondensation, the polyphosphonate melt formed is granulated in the usual manner or directly converted into shaped products such as films, fibres or bristles. The polyphosphonates obtained in this manner can be worked up in a molten solvent-free form by the usual technical processing apparatus such as extruders or injection moulding apparatus to produce structures which have extremely high flame resistance and high dimensional stability under heat.

The polyphosphonates prepared by the process according to the invention have excellent mechanical properties such as, for example, great toughness and tensile strength and substantially improved resistance to thermal ageing.

For example, a polyphosphonate prepared by the process according to the invention, based on a methyl phosphonate acid diphenyl ester and 4,4'-dihydroxy diphenyl, having a relative solution viscosity of $\kappa rel = 1.316$ (determined at 25° C. at a concentration of 0.5% by weight in methylene chloride) shows no reduction in its relative solution viscosity after 7 days ageing in air at 100° C. An aromatic polyphosphonate prepared from the same monomer by the process of Comparison Example 1 of the present Patent application and having a relative solution viscosity of $\eta rel = 1.321$ shows a reduction in its relative solution viscosity to $\eta rel = 1.267$ after 7 days ageing in air at 100° C.

A polyphosphonate based on methyl phosphonate acid diphenyl ester and 4,4'-dihydroxy diphenyl prepared by the solvent-free ester interchange process according to U.S. Pat. No. 2,682,522, using anhydrous magnesium chloride as ester interchange catalyst, initially has a relative solution viscosity of 1.144 which is found to decrease to 1.082 after only 2 days ageing in air at 100° C. (see Comparison Example 2).

The relative viscosities of the thermoplastic aromatic polyphosphonates prepared by the process according to the invention, determined at 25° C. at a concentration of 0.5% by weight in methylene chloride, range from 1.20 to over 2.0, preferably from 1.24 to 1.40.

The polyphosphonates prepared by the process according to the invention are soluble in methylene chloride, 1,1,2,2-tetrachloroethane, trichloroethylene, chloroform, chlorobenzene, 1,2-dichlorobenzene, dioxane and hexamethyl phosphoric acid triamide (HMPT).

Antistatic agents, pigments, mould release agents, thermal stabilizers, ultraviolet light stabilizers and fillers such as talcum, mineral wool, mica, calcium carbonate and dolomite as well as other fillers, including reinforcing fillers such as glass fibres, glass pellets and asbestos, may be added to the polyphosphonates.

The thermoplastic aromatic, preferably halogen-free polyphosphonates according to the invention may be used whereever thermoplastic chemical materials of maximum flame resistance are required and where in addition any evolution of toxic gases of pyrolysis under the action of very high temperature is to be avoided. Such fields of application include, for example, the motor vehicle construction industry, the aircraft construction industry, space flight and safety technology.

The thermoplastic aromatic polyphosphonates obtained by the process according to the invention described above were extruded at 240° C. to 320° C. to produce test samples.

The behaviour under impact was tested by measuring the impact strength using the method of Charpy $a_n$ according to DIN 53 453 and ASTM D 256 and by measuring the notched impact strength by the method of Charpy $a_k$ according to DIN 53 453 or ASTM D 256. The hardness was determined by measuring the ball indentation hardness HK according to DIN 53 456. The mechanicalelastic properties were tested by carrying out tension-deformation experiments, such as by measurement of the flexural-E modulus according to DIN 53 457 and measurement of the ultimate tensile strength $\sigma R$, elongation on tearing $\epsilon_R$, stretch resistance $\sigma S$ and elongation on stretching $\epsilon S$ according to DIN 53 455 (1968) as ASTM D 638.

The dimensional stability under heat was tested by measuring the Vicat softening point VSP according to DIN 53 460 or ISO/R 75. The transition temperatures $T_E$ were determined by differential thermoanalysis (DTA).

the fire characteristics were determined by measurement of the $O_2$ Index according to ASTM D 2863-70 and by measurement of the after-burning time by the UL Test (Subj. 94).

Test rods measuring 127×12.7×1.6 mm (1/16") and 127×12.7×3.2 mm (⅛") were produced by injection moulding at 300°-310° C.

The rods were subjected to the test processes according to Underwriters Laboratories, Inc. Bulletin 94, combustion test for the classification of materials.

According to these test processes, the tested materials were classified as UL-94 V-0, UL-94 V-I or UL-94 V-II on the basis of results obtained with 10 samples. The criteria for each of these V-Classificatons according to UL-94 are briefly as follows:

UL-94 V-0 Average flaming and/or glowing after removal of and igniting flame should not exceed 5 seconds and no particles capable of igniting absorbent cotton should drip from any of the samples.

UL-94 V-I Average flaming and/or glowing after removal of the igniting flame should not exceed 25 seconds and no particles capable of igniting the absorbent cotton should drip from any of the samples.

UL-94 V-II Average flaming and/or glowing after removal of the igniting flame should not exceed 25 seconds and particles which drip from the samples ignite absorbent cotton.

A test rod which burned for more than 25 seconds after removal of the igniting flame was not classified according to UL-94 but described as "burning" according to the standard conditions of the present invention. Classification UL-94 also demands that all test rods must fulfil the appropriate V assessment, otherwise all the 10 test rods are classified according to the rod giving the poorest performance. If, for example, one rod is classified as UL-94 V-II, then all the 10 rods are classified as UL-94 V-II.

EXAMPLE 1

6204 g (25.02 mol) of methylphosphonic acid diphenyl ester, 4424 g (23.78 mol) of the 4,4'-dihydroxy diphenyl, 7.6 g ($1.21 \times 10^{-2}$ mol) of 1,4-bis-(4,4"'-dihydroxy-triphenyl methyl)-benzene and 0.1 g of titanium tetrabutylate (as 1% by weight solution in chlorobenzene)

are vigorously mixed under nitrogen at 250° C. in an autoclave. Over a period of 3 hours, phenol is distilled off through a column heated to 100° C. under a vacuum which falls during this time from 250 to 100 mbar and at a temperature which increases from 250° C. to 265° C. Ester interchange is then continued for 5 hours under a pressure which generally falls to 0.3 mbar and at a reaction temperature which rises to 310° C., the viscosity of the solvent-free reaction mixture rising at the same time. The autoclave is ventilated with nitrogen, the polymer is left to settle with the stirrer switched off for 1 hour at 300° C. and the product is isolated by centrifuging under pressure (about 10 atmospheres) and granulating the strand of the molten product. 5.2 kg of a high molecular weight, amorphous polyphosphonate having a number average molecular weight of $\overline{M}_n = 26,700$ and a relative solution viscosity $\eta \mathrm{rel} = 1.316$ (determined on a 0.5% by weight solution at 25° C.) are obtained. The dependence of the relative solution viscosity on thermal ageing is shown in Table 1.

COMPARISON EXAMPLE 1

(Comparison with Example 1 of the earlier German Patent Applicaton P 29 25 207.1)

6,204 g (25.02 mol) of methylphosphonic acid diphenyl ester, 4,424 g (23.78 mol) of 4,4'-dihydroxy diphenyl, 7.6 g ($1.21 \times 10^{-2}$ mol) of 1,4-bis-(4,4"'-dihydroxy-triphenyl methyl)-benzene and 0.2 g ($1.72 \times 10^{-3}$ mol) of sodium phenolate.

are reacted by the method described in Example 1. 5.2 kg of a high molecular weight amorphous polyphosphonate having a number average molecular weight of $\overline{M}_n = 27,600$ and a relative solution viscosity of $\eta \mathrm{rel} = 1.321$ (determined on a 0.5% by weight solution in methylene chloride at 25° C.) are obtained.

Table 1 shows the dependence of the relative solution viscosity on thermal ageing.

COMPARISON EXAMPLE 2

(Comparison Example according to the method of Example 2 of U.S. Pat. No. 2,682,522).

37.2 g (0.2 mol) of 4,4'-dihydroxy diphenyl, 54.56 g (0.22 mol) of methyl phosphonic acid diphenyl ester and 0.2 g of anhydrous magnesium chloride are stirred up under a nitrogen atmosphere at 150° C. for 2 hours. The temperature is then raised to 250° C. within 3 hours while the pressure in the reaction vessel is lowered to 20 mbar in the course of 1 hour, and the reaction mixture is then distilled for 3 hours at 1-2 mbar and 250° C. 45 g of a brittle polyphosphonate having a number average molecular weight of $\overline{M}_n = 10,200$ and relative solutin viscosity of $\eta \mathrm{rel} = 1.144$ (determined on a 0.5% by weight solution in methylene chloride at 25° C.) are obtained. The dependence of the relative solution viscosity on thermal ageing is shown in Table 1.

The fire resistance values and mechanical test values of the polyphosphonates of Example 1 and Comparison Example 1 are identical and entered in Table 2.

Foils 50μ in thickness were prepared from solutions in methylene chloride of the polyphosphonates of Example 1 and of Comparison Examples 1 and 2 and tempered in air at 100° C.

The foil prepared from the polyphosphonate of Comparison Example 2 was brittle from the very start owing to its low molecular weight.

Samples of the foils were taken at fixed time intervals and their relative solution viscosity in a 0.5% by weight solution in methylene chloride at 25° C. was determined. The results obtained are compared in the Table below.

TABLE 1

| | Polymer from | | |
|---|---|---|---|
| Time difference | Example 1 $\eta$ rel | Comparison Example 1; $\eta$ rel | Comparison Example 2; $\eta$ rel |
| 0 | 1.316 | 1.321 | 1.144 |
| 2 days | 1.317 | 1.306 | 1.082 |
| 4 days | 1.316 | 1.290 | — |
| 5 days | 1.315 | 1.282 | — |
| 7 days | 1.316 | 1.267 | — |

TABLE 2

Fire resistance values and mechanical test values of the polyphosphonate from Example 1 and Comparison Example 1

| Test | Test Standard | Test result |
|---|---|---|
| O$_2$-Index | ASTM-D 2863-70 | 75% |
| UL test (Subj. 94) | | VO (1/16") Afterburning time: 0. sec. |
| Vicat B | DIN 53 460 | 130° C. |
| Impact strength a$_n$ | DIN 53 453 | unbroken |
| Notched impact strength a$_k$ | DIN 53 453 | 32 |
| Ball indentation hardness HK | DIN 53 456 | 102 MPa |
| Flexural E modulus | DIN 53 457 | 2610 MPa |
| Flexural strength | DIN 53 457 | 59 MPa |
| Tension E modulus | DIN 53 457 | 2420 MPa |
| Elongation resistance ΣS | DIN 53 455 (1968) | 56 MPa |
| Elongation on stretching εS | DIN 53 455 | 8% |
| Ultimate tensile strength Σ$_R$ | DIN 53 455 | 44 MPa |
| Elongation on tearing εR | DIN 53 455 | 21% |

EXAMPLE 4

Example 1 was repeated but the titanium tetrabutylate was replaced by an equal quantity of zirconium-n-butylate; Zr(OC$_4$H$_9$)$_4$. The polyphosphonate obtained had a relative solution viscosity of $\eta$rel = 1.320; $\overline{M}_n$ = 26,900.

EXAMPLE 5

Example 1 was repeated but the titanium tetrabutylate was replaced by an equal quantity of vanadyl-isopropylate;

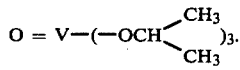

$$O = V-(-OCH\begin{smallmatrix}CH_3\\CH_3\end{smallmatrix})_3.$$

The polyphosphonate obtained had a relative solution viscosity of $\eta$rel = 1.309; $\overline{M}_n$ = 25,900.

EXAMPLE 6

Example 1 was repeated but the titanium tetrabutylate was replaced by an equal quantity of dibutyl tin oxide. The polyphosphonate obtained had a relative solution viscosity of $\eta$rel = 1.307; $\overline{M}_n$ = 25,600.

EXAMPLE 7

Example 1 was repeated but the titanium tetrabutylate was replaced by an equal quantity of dibutyl-dimethoxy tin. The polyphosphonate obtained had a relative solution viscosity of $\eta$rel = 1.321; $\overline{M}_n$ = 27,000.

EXAMPLE 8

Example 1 was repeated but the titanium tetrabutylate was replaced by an equal quantity of antimony acetate. The polyphosphonate obtained had a relative solution viscosity of $\eta$rel = 1.319; $\overline{M}_n$ = 26,800.

EXAMPLE 9

Example 1 was repeated but the titanium tetrabutylate was replaced by an equal quantity of bismuth benzoate. The polyphosphonate obtained had a relative solution viscosity of $\eta$rel = 1.323; $\overline{M}_n$ = 27,200.

EXAMPLE 10

Example 1 was repeated but the titanium tetrabutylate was replaced by an equal quantity of dibutyl tin tartrate. The polyphosphonate obtained had a relative solution viscosity of $\eta$rel = 1.318; $\overline{M}_n$ = 26,600.

EXAMPLE 11

Example 1 was repeated but the titanium tetrabutylate was replaced by an equal quantity of tributyl tin acetate. The polyphosphonate obtained had a relative solution viscosity of $\eta$rel = 1.324; $\overline{M}_n$ = 27,300.

EXAMPLE 12

Example 1 was repeated but the titanium tetrabutylate was replaced by an equal quantity of a mixture of germanium dioxide and titanium tetrabutylate in proportions by weight of 1:1. The polyphosphonate obtained had a relative solution viscosity of $\eta$rel = 1.315; $\overline{M}_n$ = 26,200.

The polyphosphonates obtained according to Examples 4 to 12 were identical in their properties, in particular their thermal age resistance, to the polyphosphonate obtained according to Example 1.

EXAMPLE 13

1,548.8 g (6.245 mol) of methyl phosphonic acid diphenyl ester,
1,354.0 g (5.94 mol) of 2,2-bis-(4-hydroxyphenyl)propane (bisphenol A).
18.8 g (3×10$^{-2}$ mol) of 1,4-bis-(4,4"-dihydroxytriphenyl methyl)-benzene, and
0.07 g of titanium tetrabutylate (as a 1% by weight solution in chlorobenzene)

are reacted by a method analogous to that described in Example 1. 1.53 kg of an aromatic amorphous polyphosphonate having a relative solution viscosity of $\eta$rel = 1.280; $\overline{M}_n$ = 22,000 are obtained. P = 10.7% by weight, glass transition temperature T$_G$ = 90° C. (according to differential thermoanalysis).

A 50μ foil of the polyphosphonate obtained according to Example 13 showed no signs of reduction in its relative solution viscosity after 7 days ageing in air at 100° C.

We claim:

1. A process for the preparation of a linear or branched-chain thermoplastic aromatic polyphosphonate having an average molecular weight number average $\overline{M}_n$ in the range of from 11,000 to 200,000, which comprises solvent-free ester interchange of 97 to 100 mol of at least one diaryl phosphonate with 90 to 99 mol of at least one aromatic dihydroxy compound to obtain linear polyphosphonate, or the interchange of said diaryl phosphonate with said aromatic dihydroxy compound in the presence of from 0.01 to 3 mol %, based on 100 mol % of the diaryl phosphonate, of a triaryl phosphate or in the presence of from 0.01 to 3 mol %, based on 100 mol % of the aromatic dihydroxy compound, of an aromatic trihydroxy or tetrahydroxy compound or a mixture thereof to obtain branched polyphosphonate, provided, that the sum of branching triaryl phosphates and branching aromatic trihydroxy or tetrahydroxy compounds is not more than a total of 3 mol %, said interchange being conducted at 90°-340° C. in an oxygen-free gas atmosphere at atmospheric pressure or reduced pressure, with removal of the volatile constituents by distillation, and in the presence of a catalytic quantity of an ester interchange catalyst which comprises at least one compound taken from the group of $C_1$–$C_{18}$ tetraalkyl titanates, $C_2$–$C_4$ dialkyl tin oxides, $C_2$–$C_4$-dialkyl-$C_1$–$C_4$-dialkoxy tin compounds, $C_3$–$C_{18}$ tetraalkyl zirconates and $C_2$–$C_{18}$ trialkyl vanadylates, antimony or bismuth salts, $C_2$–$C_4$ dialkyl stannic acid esters, $C_2$–$C_4$ trialkyl stannic acid esters, or a mixture of at least one compound from the above groups and germanium dioxide and titanium dioxide.

2. A process for the preparation of a linear or branched-chain thermoplastic aromatic polyphosphonate according to claim 1, wherein the catalyst is used in a quantity of from $10^{-4}$ to $2\times10^{-2}\%$ by weight, based on 100% by weight of the aromatic dihydroxy compounds put into the process.

3. A process for the preparation of a linear or branched-chain thermoplastic aromatic polyphosphonate according to claim 1, wherein the ester interchange catalyst used include a $C_1$–$C_{18}$ tetraalkyl titanate.

4. A process for the preparation of a linear or branched-chain thermoplastic aromatic polyphosphonate according to claim 3, wherein the ester interchange catalyst used includes titanium tetrabutylate.

5. A process for the preparation of a linear or branched-chain thermoplastic aromatic polyphosphonate according to claim 1, wherein the ester interchange catalyst used includes dibutyl tin oxide.

6. A process for the preparation of a linear or branched-chain thermoplastic aromatic polyphosphonate according to claim 1, wherein the ester interchange catalyst used includes tributyl tin acetate.

7. A process for the preparation of a linear or branched-chain thermoplastic aromatic polymethyl phosphonate according to claim 1, wherein the diaryl phosphonate used includes methyl phosphonic acid diphenyl ester.

* * * * *